United States Patent [19] [11] 3,870,658
Farrauto et al. [45] Mar. 11, 1975

[54] COPPER CHROMITE-ALUMINA CATALYSTS HAVING HIGH-TEMPERATURE STABILITY

[75] Inventors: Robert J. Farrauto, Painted Post; Karl E. Hoekstra, Corning; Robert D. Shoup, Painted Post, all of N.Y.

[73] Assignee: Corning Glass Works, Corning, N.Y.

[22] Filed: Mar. 2, 1973

[21] Appl. No.: 337,293

[52] U.S. Cl. ............................ 252/465, 423/213.2
[51] Int. Cl. ............................................. B01j 11/22
[58] Field of Search .................. 252/465; 423/213.2

[56] References Cited
UNITED STATES PATENTS

| | | | |
|---|---|---|---|
| 2,280,060 | 4/1942 | Burk et al. | 252/465 X |
| 3,001,929 | 9/1961 | Moy et al. | 252/465 X |
| 3,291,564 | 12/1966 | Kearby | 252/465 X |
| 3,410,651 | 11/1968 | Brandenburg et al. | 252/465 X |
| 3,444,099 | 5/1969 | Taylor et al. | 252/465 |
| 3,787,322 | 1/1974 | Koberstein et al. | 252/465 |

FOREIGN PATENTS OR APPLICATIONS

| | | | |
|---|---|---|---|
| 1,138,444 | 1/1969 | Great Britain | 252/465 |
| 1,168,075 | 10/1969 | Great Britain | 252/465 |

Primary Examiner—Winston A. Douglas
Assistant Examiner—W. J. Shine
Attorney, Agent, or Firm—Clarence R. Patty, Jr.; Kees van der Sterre

[57] ABSTRACT

The activity and stability of copper chromite catalysts have been found to be sensitive to both copper-to-chromium ratio and to alumina content. Alumina-containing catalysts of improved stability for the oxidation of carbon monoxide at high temperatures and the use of these catalysts in the control of automotive exhaust emissions are described.

2 Claims, 3 Drawing Figures

COPPER CHROMITE-ALUMINA CATALYSTS HAVING HIGH-TEMPERATURE STABILITY

BACKGROUND OF THE INVENTION

Copper-chromium-containing catalysts have a variety of applications in industrial processing for hydrogenation and dehydrogenation reactions as well as certain selective oxidation processes. The temperatures required for these processes, however, typically do not exceed 500°C. and thus thermal stability in the catalyst is not a major problem, at least initially.

More recently, copper chromite catalysts have become primary candidates for automotive emissions control. Proposed methods to control auto emissions via catalytic devices involve inserting a dispersed catalyst supported by inert beads or a monolithic honeycomb structure in the automobile exhaust train. Starting at temperatures of about 200°F and above in the presence of excess oxygen, the catalyst is expected to convert major proportions of noxious emissions such as carbon monoxide and unburned hydrocarbons to harmless carbon dioxide and water in accordance with government specifications. However, for automotive exhaust applications the catalyst must be able to control CO and hydrocarbon emissions in an environment wherein sustained temperatures in excess of 300°C. and occasional excursions to 800°C. or higher are encountered.

Copper chromite catalysts comprising the phases cupric chromite ($CuCr_2O_4$) and, optionally, cupric oxide (CuO) are quite active for the oxidation of carbon monoxide and hydrocarbons, but are not inherently stable at temperatures in the 800°C. range. This is evidenced by the fact that sustained heating of copper chromites at such temperatures produces substantial reductions in activity for the oxidation of hydrocarbons and carbon monoxide. These heat-induced reductions in activity are presently attributed to the growth of a cuprous chromite ($Cu_2Cr_2O_4$) phase which exhibits larger average particle size than $CuCr_2O_4$.

It was thought that the stabilization of copper chromite catalysts against the formation of $Cu_2Cr_2O_4$ at high temperatures would improve their usefulness for automotive exhaust applications. The formation of $Cu_2Cr_2O_4$ at temperatures below about 900°C. occurs through the slow reaction: $CuO + CuCr_2O_4 \rightarrow Cu_2Cr_2O_4 + \frac{1}{2} O_2$. Thus a limited degree of success in improving the thermal stability of copper chromite catalysts has in the past been achieved through the use of metal oxide additives to suppress $Cu_2Cr_2O_4$ formation and/or through the removal of the reactive copper oxide phase from the catalyst prior to use, for example, by leaching.

Alumina is also widely used in the field of catalysis, both as an active catalytic agent and as an inert support material for other catalysts. For example, U.S. Pat. No. 2,280,060 describes coke-inhibiting $Al_2O_3$—CuO—$Cr_2O_3$ catalysts useful in the aromatization of hydrocarbons. Alumina is also quite commonly employed as a support material for other catalysts in high-temperature oxidative applications such as automotive exhaust emissions control systems because it combines the desirable properties of inertness high surface area and refractoriness. Alumina-supported noble metal catalysts, for example, provide a very high degree of activity for the oxidation of carbon monoxide and hydrocarbons under high-temperature conditions and are very strong candidates for automotive emissions control applications. However the high cost of noble metals is a negative factor and thus the commercial importance of developing an active thermally-stable base metal catalyst composition suitable for use in automotive emissions control systems is substantial.

It is therefore the principal object of the present invention to provide a copper chromite-based catalyst of improved thermal stability for high-temperature applications, such as the oxidation of carbon monoxide and unburned hydrocarbons in the automobile exhaust.

Other objects and advantages of the invention will become apparent from the following description and examples thereof.

SUMMARY OF THE INVENTION

Our invention is based on the discovery that certain active copper chromite catalysts can be thermally stabilized through the addition of specified quantities of alumina thereto. We have found that the suppression of $Cu_2Cr_2O_4$ formation can be realized by limiting the excess CuO phase through proper stoichiometric control of CuO, $Cr_2O_3$, and $Al_2O_3$, with leaching being employed as an additional tool to remove excess CuO, if desired.

Thus in one aspect our invention comprises leached copper chromite-alumina catalysts of improved stability having an alumina content ranging about 5–25% by weight. These catalysts have a copper-to-chromium atom ratio of about 0.5:1 as the result of leaching to remove free CuO, and consist essentially of only $CuCr_2O_4$ and $Al_2O_3$ crystal phases with at most only minor amounts of $CuCr_2O_4$—$Al_2O_3$ solid solution. The catalysts resist the formation of $Cu_2Cr_2O_4$ and demonstrate better thermal stability than alumina-free leached copper chromites.

In a second aspect, our invention comprises unleached copper chromite-alumina catalysts of improved stability having a copper-to-chromium atom ratio in the range of about 0.5–1.0, an aluminum-to-chromium ratio R in the range of about 0.2–1.0, and a minimum copper content, calculated as CuO, of at least about $[45 + 5 (R - 0.2)/0.8]$ mole percent of the composition, R being the aluminum-to-chromium ratio as set forth above. These catalysts contain CuO, $CuCr_2O_4$ and $CuAl_2O_4$ crystal phases, are resistant to the formation of undesirable $Cu_2Cr_2O_4$, and are active for the oxidation of carbon monoxide and hydrocarbons to $CO_2$ and water.

The improved thermal stability of our copper chromite-alumina catalysts is evidenced by the retention of a high degree of activity for the oxidation of carbon monoxide and hydrocarbons after exposure to elevated temperatures, a property which renders these catalysts eminently suitable for use in oxidation processes at temperatures up to about 800°C. Thus a further important aspect of the invention resides in the use of the described catalysts in processes such as the treatment of automotive exhaust gases which require the oxidation of these species at sustained elevated temperatures in the 600°–800°C. range without excessive degradation.

DESCRIPTION OF THE DRAWING

The dependence of thermal stability on the composition of catalysts in the copper chromite-alumina system can be seen in the drawing, wherein.

DETAILED DESCRIPTION

Figure 1:
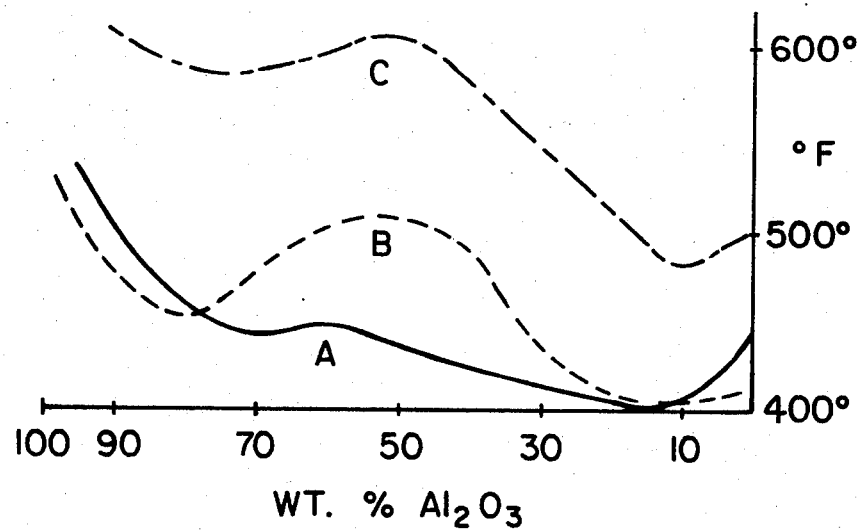
FIG. 1 is a graph showing the relationship between the alumina content of acid-leached copper chromite-alumina catalysts containing essentially no free CuO and the resistance of the catalysts to degradation by accelerated thermal aging. Solid curve A reflects the carbon monoxide oxidation activity of catalysts after sintering at 600°C. for 4 hours, while broken curve B and chained curve C show the changes in activity which occur after thermal aging for 24 hours in air at 800°C. and 1000°C. respectively.

The improved thermal stability of the copper chromite-alumina catalysts of the present invention is not critically dependent upon the method used to prepare the catalyst. Any means which will insure thorough dispersion of alumina throughout the copper chromite phase in the proper proportions may be employed. One suitable method of preparation comprises providing a solution containing the nitrates of copper, aluminum, and chromium in proportions which will yield the desired composition in the prepared catalyst, drying the solution at 150°C., and firing the dried product at 600°C. for 2-4 hours to obtain a catalytically-active powder. Alternatively slurries containing finely-divided oxides such as colloidal alumina in combination with dissolved compounds of the other constituents may be dried and fired to product the catalyst either as an active coating on a refractory ceramic support or an unsupported powder.

As previously mentioned, it is desirable from the standpoint of thermal stability to provide copper-chromite catalysts having a copper-to-chromium atom ratio of about 0.5:1, wherein no excess CuO which may form cuprous chromite is present. This ratio can be attained by adjustment of the ratio of copper compounds to chromium compounds in the starting mixture; however, the preparation of highly active catalysts from starting mixtures wherein the copper-to-chromium atom ratio approaches 0.5 (equivalent to stoichiometric $CuCr_2O_4$) is difficult because incomplete reaction between Cu and Cr results in the presence of a relatively inactive $Cr_2O_3$ phase. Thus in the preparation of copper chromite-alumina catalysts having copper-to-chromium ratios near 0.5:1 it is useful to prepare a starting mixture containing an excess of copper to insure complete reaction of all of the chromium, and thereafter to remove the excess CuO present in the prepared catalyst by leaching with a strong mineral acid. The removal of excess CuO by this means may be accomplished either before or after the addition of alumina to the catalyst, but the latter is preferred.

Leached copper chromite catalysts containing no excess CuO might be expected to demonstrate substantially better thermal stability than catalysts containing excess copper. Nevertheless we have discovered that even these copper chromite catalysts may be further stabilized against thermal degradation through the addition of controlled amounts of alumina. The stabilizing effect of alumina additions on leached copper chromite is readily apparent from the following example.

EXAMPLE I

A series of samples of powdered crystalline copper chromite-alumina catalysts is prepared from aqueous slurries containing dissolved $Cu(NO_3)_2$ and $Cr(NO_3)_3$, together with measured additions of colloidal alumina. The slurries are first heated to 150°C. to evaporate essentially all of the water, and thereafter fired at 600°C. for 4 hours to convert the mixtures of dry nitrates to a series of copper chromite-alumina catalysts. The nitrates are present in the original solutions in proportions which will yield a copper-to-chromium atom ratio of about 1:1 in the fired materials, while the alumina content varies from sample to sample from a minimum of zero to a maximum of 100%. X-ray examination of these materials discloses the presence of $Al_2O_3$, CuO, and $CuCr_2O_4$ crystal phases. Excess CuO is then removed from the catalysts by treatment with boiling 6 M HCL for about an hour, followed by thorough water washing. The Cu:Cr ratio in the acid-leached catalysts is about 0.5:1, and X-ray examination indicates that only $Al_2O_3$ and $CuCr_2O_4$ phases remain.

The powdered crystalline catalysts prepared as described are then tested for catalytic activity using a differential scanning calorimeter. The calorimeter permits the determination of the relative extent of oxidation of a flowing carbon monoxide-air mixture from the amount of heat generated in the course of the oxidation reaction. A comparison of activity between catalysts may then be made, based on the fact that more active catalysts achieve an equivalent degree of oxidation of carbon monoxide, e.g., 50% conversion to $CO_2$, at lower reaction temperatures than do less active catalysts.

Curve A of FIG. 1 of the drawing is a plot reflecting the catalytic activity of a series of copper chromite-based catalysts prepared as described. Relative catalytic activities, compared on the basis of relative 50% carbon monoxide conversion temperatures (vertical axis), are plotted as a function of alumina content (horizontal axis). Alumina contents are in weight percent of the copper chromite-alumina samples and 50% conversion temperatures are in degrees Fahrenheit. It is evident from a study of curve A that catalysts containing alumina in amounts not exceeding about 35% by weight demonstrate a higher level of oxidation activity toward carbon monoxide than alumina-free copper-chromite catalysts.

Curve B of FIG. 1 is a plot showing the effect on catalytic activity of accelerated thermal aging for 24 hours at 800°C. in air for a similarly prepared series of leached copper chromite-alumina compositions. Curve B suggests that catalysts containing 5-25% alumina by weight retain a substantially greater proportion of their initial activity after exposure to this aging treatment than do catalysts in the 25-75% alumina range. Curve B also shows a second unexpected region of stability in the 75-85% alumina range; however the activity of these catalysts is substantially less and they are not deemed of practical utility for emissions control applications.

Curve C of FIG. 1 is a plot showing the effect on catalytic activity of further accelerated thermal aging for 24 hours at 1000°C. in air for a similarly prepared series of leached copper chromite-alumina catalysts. This treatment causes some degradation even in the 5–25% alumina-containing catalysts; however, the substantially better stability of these compositions as compared with those containing increased additions of alumina is readily apparent.

The effect of alumina content on the thermal stability of copper chromite with respect to hydrocarbon oxidation is not as pronounced as in the case of carbon monoxide oxidation. Thus copper chromite-alumina catalysts which have been aged for 24 hours at 800°C. demonstrate a level of oxidation activity which is very nearly independent of alumina concentration, particularly in the 5–25% alumina region which is of interest for the oxidation of carbon monoxide. For this reason, thermal stability with respect to the oxidation of carbon monoxide is considered to be the most inportant factor to be controlled in optimizing composition in the copper chromite-alumina field. Leached copper chromite-alumina catalysts which are particularly stable are those containing about 5–15% alumina by weight and essentially no excess CuO (a copper-to-chromium ratio of about 0.5:1).

Notwithstanding the stabilizing effect of alumina on leached copper chromite catalysts as evidenced by the above data, it is in many cases desirable to obtain stabilization of the catalysts witout the need for leaching. Another important aspect of our invention therefore deals with the stabilization of unleached copper chromites containing alumina through the stoichiometric control of the copper-to-chromium and aluminum-to-chromium atom ratios. In this way, catalysts characterized by the presence of CuO, $CuCr_2O_4$ and $CuAl_2O_4$ crystal phases which are resistant to the formation of $Cu_2Cr_2O_4$, active for the complete oxidation of carbon monoxide and hydrocarbons, and of improved stability to temperatures of up to 800°C. may be produced.

The preparation of an unleached catalyst of improved stability is described in detail in Example II below.

EXAMPLE II

A refractory honeycomb ceramic support structure composed principally of cordierite is selected for treatment. A slurry consisting essentially of powdered alumina, powdered $Cr_2O_3$, and an aqueous solution of $Cu(NO_3)_2$ is prepared, and the honeycomb support structure is coated with this slurry by repeated dipping and drying until a loading of 25% by weight based on the weight of the dry, coated structure is obtained. The coated structure is then fired at 600°C. for 2 hours in air. The resultant fired coating consists essentially, in mole percent on the oxide basis as calculated from the proportions of the slurry constituents, of about 48.7% CuO, 30.5% $Cr_2O_3$ and 20.8% $Al_2O_3$, the Cu-to-Cr atom ratio being about 0.8 and the Al-to-Cr atom ratio being about 0.68.

The catalytic activity of the structure prepared as described is measured according to a bench testing procedure wherein a simulated exhaust gas consisting of about 1.0% carbon monoxide, 250 ppm $C_3H_6$, 1.25% $O_2$, 10% water vapor and the remainder nitrogen by volume is passed through the structure at a space velocity of about 15,000 $hr.^{-1}$ while the conversion of carbon monoxide and propylene to carbon dioxide and water is monitored. The extent of conversion of each oxidizable constituent is proportional to the temperature of the reaction environment as well as to the acitivity of the catalyst. Therefore, the temperatures at which 50% of each constituent is converted is deemed to be a useful relative measure of catalytic activity, with lower 50% conversion temperatures indicating a higher level of activity for the conversion and vice versa.

After 50% conversion temperatures for carbon monoxide and propylene have been established, the structure is fired at 800°C. for 24 hours in air to accelerate thermal degradation and then retested. It is then fired at 800°C. for an additional 24 hours in air and retested, and finally fired at 900°C. for 24 hours in air and retested. The results of this series of tests are set forth in Table I below:

TABLE I

| | 50% Conversion Temperatures (°F) Copper Chromite — 20% Alumina on Monolith | | | |
|---|---|---|---|---|
| Oxidizable Constituent | After Initial Preparation | After 24 Hours-800°C. | After 48 Hours-800°C. | After 24 Hours-900°C. |
| CO | 420 | 450 | 435 | 505 |
| Propylene | 600 | 660 | 690 | 745 |

In contrast to the above, a similarly prepared device comprising a honeycomb support structure, an alumina support coating, and an essentially alumina-free copper chromite catalyst, when similarly tested for activity before and after thermal aging at 800°C. for 24 hours in air, yields the results shown in TABLE II below. The copper chromite catalyst, at a loading of at least about 20% by weight of the coated structure, consists of about 67 mole percent CuO and 33 mole percent $Cr_2O_3$ with a Cu-to-Cr atom ratio of about 1.0. The catalyst is applied from a solution of mixed copper and chromium nitrates and is fired at 600°C. for 4 hours to obtain the copper chromite phase.

TABLE II

| | 50% Conversion Temperatures (°F) Pure Copper Chromite on Monolith | | |
|---|---|---|---|
| Oxidizable Constituent | After Initial Preparation | After 24 Hours-800°C. | After 48 Hours-800°C. |
| CO | 420 | 500 | 550 |
| Propylene | 640 | 700 | 700 |

From the above data, the stabilizing effect of incorporated alumina on supported copper chromite catalysts is readily apparent.

Figure 2:
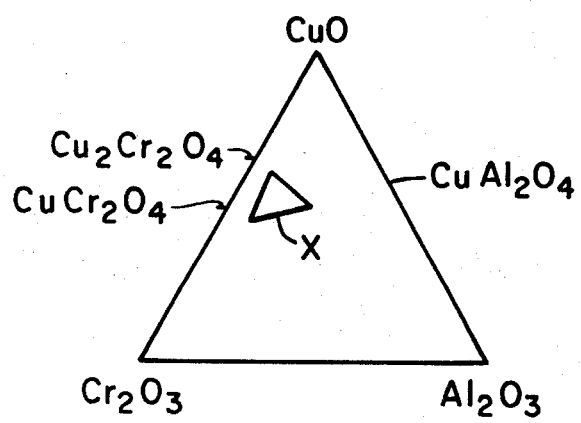
FIG. 2 of the DRAWING is a diagram of the copper oxide-chromium oxide-aluminum oxide ternary system wherein the region X encompasses unleached copper chromite-alumina catalysts within the scope of the present invention demonstrating improved stability at elevated temperatures.

A survey of the copper chromite-alumina system employing the methods used in generating the data shown in Tables I and II above permits the definition of a highly stable group of unleached copper chromite-alumina oxidation catalysts having a copper-to-chromium atom ratio between about 0.5 and 1.0, an aluminum-to-chromium atom ratio (R) between about 0.2 and 1.0, and a minimum copper content, calculated as CuO, of at least about $[45 + 5 (R - 0.2)/0.8]$ mole percent of the composition, R being the aluminum-to-chromium atom ratio as hereinabove set forth. In FIG. 2 of the drawing, which is a ternary diagram of the $CuO$-$Cr_2O_3$-$Al_2O_3$ composition system, these catalysts are encompassed by the triangular region denoted X.

Catalysts within this composition region, which are characterized by the presence of CuO, $CuCr_2O_4$ and $CuAl_2O_4$ crystal phases, are resistant to the formation of $Cu_2Cr_2O_4$ and thus provide an excellent combination of activity and thermal stability so as to be quite suitable for use in high temperature oxidation processes such as the treatment of automotive exhaust gases to oxidize carbon monoxide and unburned hydrocarbons present therein. The effectiveness of these catalysts has been demonstrated by the use of automotive engine exhaust systems of catalyst-coated monolithic support structures such as described in Example II above.

Figure 3:
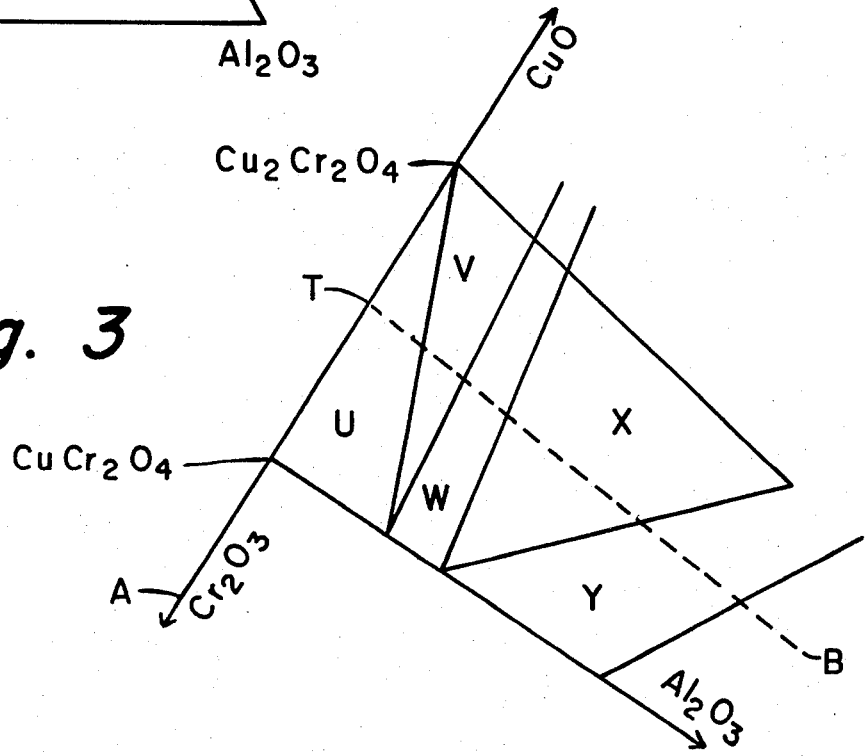
FIG. 3 of the DRAWING is a subsolidus phase diagram of a portion of the copper oxide-chromium oxide-aluminum oxide ternary system enlarged to show pertinent regions of this system for the purpose of comparing the stability of catalysts in these regions after accelerated thermal aging for 24 hours at 800°C. in air.

A further understanding of the mode of operation of invention as it is presently understood may be gained by a study of FIG. 3 of the drawing, which is a sub-solidus phase diagram of a portion of the copper oxide-chromium oxide-aluminum oxide ternary system showing the various crystal phases found in pertinent composition regions of this system after firing for 24 hours at 800°C. The portion shown lies on the $CuO$—$Cr_2O_3$ binary A near the compositions $CuCr_2O_4$ and $Cu_2Cr_2O_4$. Although the system is presented as being ternary, CuO may reduce to ½ $Cu_2O$, making the system more properly quaternary; however, since the copper contents of the two phases are equivalent, ½ $Cu_2O$ has been projected onto CuO for convenience in interpreting the diagram.

An understanding of this diagram is facilitated by a consideration of broken line B representing a traverse of the diagram away from the $CuO$—$Cr_2O_3$ binary in the direction of increasing alumina. The starting point T is a copper chromite catalyst with a copper-to-chromium atom ratio of about 0.8. While the starting phases after initial reaction of this mixture at some temperature below 800°C are undoubtedly CuO and $CuCr_2O_4$, firing for 24 hours at 800°C. produces a mixture of $CuCr_2O_4$ and $Cu_2Cr_2O_4$ which is substantially less active than pure copper chromite.

As alumina is added to the composition, the regions U and V are reached. In these regions, a $CuCr_2O_4$ solid solution (s.s.) phase predominates, although at higher CuO levels some free CuO may also be present. $CuCr_2O_4$ s.s. comprises both $CuCr_2O_4$ and alumina, and displays essentially the catalytic activity of $CuCr_2O_4$ insofar as the oxidation of CO and hydrocarbons is concerned. However, at these alumina levels, some undesirable $Cu_2Cr_2O_4$ is still present and measurements of the activities of catalysts in these regions indicate that they are still not sufficiently stable for high temperature use.

Referring again to FIG. 3, the further addition of alumina produces a composition falling within region W wherein the presence of $Cu_2Cr_2O_4$ is diminished and CuO and $CuCr_2O_4$ s.s. predominate. The combined presence of CuO and $CuCr_2O_4$ together with the absence of $Cu_2Cr_2O_4$ indicates that a composition area demonstrating relatively stable catalystic activity to 800°C. has been reached. Further alumina additions produce compositions in regions X and Y which are characterized by the continued absence of $Cu_2Cr_2O_4$, as well as the appearance of a $CuAl_2O_4$ s.s. phase consisting of $CuAl_2O_4$ and $Cr_2O_3$. $CuAl_2O_4$ s.s. is not as active as $CuCr_2O_4$ for the oxidation of CO and hydrocarbons; however, despite the obvious dilution of highly active $CuCr_2O_4$ with moderately active $CuAl_2O_4$, the absence of $Cu_2Cr_2O_4$ should provide a catalyst of improved thermal stability. A study of the activity of compositions in these regions indicates that compositions falling within region X (a $CuO$-$CuCr_2O_4$ s.s. -$CuAl_2O_4$ s.s. compatibility triangle) demonstrate the highest level of CO oxidation activity and stability. This region corresponds to the region denoted X on the $CuO$-$Cr_2O_3$-$Al_2O_3$ ternary composition diagram of FIG. 2.

Beyond region Y in the direction of increasing $Al_2O_3$ content, $Al_2O_3$ and $Cr_2O_3$ solid solutions are present which have been shown to be of relatively poor catalytic activity and/or stability. These compositions would not be suitable for the oxidation of CO and hydrocarbons at elevated temperatures in automotive emisssions control systems.

The above results indicate that there is a region in the copper chromite-alumina composition system wherein the formation of $Cu_2Cr_2O_4$ is suppressed. If the elimination of $Cu_2Cr_2O_4$ aids thermal stability as has been proposed, then the addition of alumina in quantities which are sufficient to draw the composition out of $Cu_2Cr_2O_4$-containing areas, but which are insufficient to produce catalytically inactive phases, provides a useful means for improving the thermal stability of copper chromite catalysts.

We claim:

1. A leached copper chromite-alumina catalyst having a composition consisting essentially of 5–25% alumina and the remainder copper chromite by weight, said catalyst consisting essentially of crystal phases of $Al_2O_3$ and $CuCr_2O_4$ and being resistant to the formation of the crystal phase $Cu_2Cr_2O_4$, said catalyst being formed by:

a. preparing an aqueous solution of a mixture of an aluminum salt or alumina, a copper salt, and a chromium salt or chromium oxide wherein the copper-to-chromium atom ratio exceeds 0.5:1, drying to remove water and sintering to produce a product containing $Al_2O_3$, $CuCr_2O_4$ and excess CuO; and b. removing the excess CuO from the product by leaching with a strong mineral acid to produce a catalyst wherein the copper-to-chromium atom ratio is about 0.5:1.

2. A leached copper chromite-alumina catalyst according to claim 1, wherein the alumina content ranges from about 5 to about 15% by weight.

* * * * *